UNITED STATES PATENT OFFICE.

ARTHUR LÜTTRINGHAUS, HEINRICH VON DIESBACH, AND ERNST SCHWARZ, OF MANNHEIM, GERMANY, ASSIGNORS TO BADISCHE ANILIN & SODA FABRIK, OF LUDWIGSHAFEN-ON-THE-RHINE, GERMANY, A CORPORATION.

BLUE COLORING-MATTERS CONTAINING SULFUR.

1,083,110.  Specification of Letters Patent.  Patented Dec. 30, 1913.

No Drawing.  Application filed October 16, 1911.  Serial No. 654,796.

*To all whom it may concern:*

Be it known that we, ARTHUR LÜTTRINGHAUS, HEINRICH VON DIESBACH, and ERNST SCHWARZ, subjects the first and third of the King of Prussia, the second a citizen of the Swiss Republic, residing at Mannheim, Germany, have invented new and useful Improvements in Blue Coloring-Matters Containing Sulfur, of which the following is a specification.

Our invention relates to new coloring matters containing sulfur which are characterized by consisting, when dry, of dark powders which yield from blue to violet solutions in concentrated sulfuric acid, and which are practically insoluble in caustic alkali solution and in sodium sulfid solution, but yield solutions with a solution of ammonium sulfid containing caustic soda, which solutions, when poured on filter paper, rapidly oxidize giving blue to violet stains. Further our new coloring matters are soluble in alkaline hydrosulfite solution yielding yellowish vats, and dye cotton from these vats from green-blue to violet-blue shades of excellent fastness against the action of washing, potting and light, and those produced from dialkyl-amino compounds are also fast against chlorin.

We can obtain our new coloring matters by treating certain para-amino-pará-hydroxy-diphenylamin compounds or analogous bodies, as hereinafter defined, with alkaline polysulfids containing a high proportion of sulfur, for instance corresponding to the constitution $Na_2S_5$ to $Na_2S_8$, while carrying out the reaction for a comparatively long time in alcoholic or aqueous solution.

Among the compounds which can be used for the production of coloring matters according to this invention we mention para-amino-pará-hydroxy-diphenylamin and derivatives thereof, including those containing either one alkyl group or two alkyl groups in the amino group, further the corresponding indophenols, derivatives of these compounds containing halogen in the ortho position to the hydroxyl group. Further monoalkyl or dialkyl para-amino-pará-indophenol-thiosulfonic acids, the corresponding mercaptans or disulfids and the corresponding compounds in which the thiazin ring has been formed (see the specification of Letters Patent No. 679,199), or a leuco compound of any of these bodies may be used. In addition to the aforesaid diphenylamin compounds and indophenol compounds and the like, the coloring matters which are soluble in sodium sulfid solution and which are obtainable by treating the aforesaid diphenylamin and analogous compounds with sulfur and sodium sulfid can also be treated according to our invention and give rise to coloring matters practically insoluble in sodium sulfid solution, but capable of dyeing cotton from an alkaline hydrosulfite vat. In particular, we mention the coloring matter obtainable from dimethyl-thionolin as described in the specification of Letters Patent No. 679,199, and also those obtainable from the various dialkyl-amino-pará-hydroxy-diphenylamins (see the specifications of Letters Patent No. 693,632 and of British Patent No. 7726/01).

The crude coloring matters obtained as aforesaid can be purified by extraction with hot sodium sulfid solution which removes impurities, but leaves our new coloring matters undissolved.

The following examples will serve to illustrate further the nature of our invention and how it can be carried into practical effect, but our invention is not confined to these examples. The parts are by weight.

Example 1: Introduce 23.2 parts of anhydrous sodium tetrasulfid into 60 parts of alcohol, add 18 parts of sulfur and heat, in a reflux apparatus, until a solution is obtained. Then add 12 parts of the indophenol obtainable from dimethyl-para-phenylene-diamin and phenol, and possessing a constitution corresponding to the formula

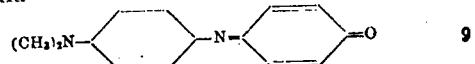

and boil the mixture for from 40 to 48 hours. Then filter off the product and extract it with hot 10% sodium sulfid solution. The coloring matter thus obtained is practically insoluble in sodium sulfid solution, but with alkaline hydrosulfite it yields a light yellow vat which dyes cotton beautiful blue shades of excellent fastness, in particular against washing, topping, potting, and chlorin.

Example 2: Prepare a solution from 32 parts of crystallized sodium sulfid, 19.4 parts of sulfur, and 16 parts of water, and introduce 8 parts of para-dimethyl-amino-pará-hydroxy-diphenylamin and boil the whole, while well stirring, for about 60 hours in a reflux apparatus. Then grind the melt with 50 parts of 10% sodium sulfid, boil up and filter. Extract the residue repeatedly with hot 10% sodium sulfid solution and finally wash with boiling water. The coloring matter has properties similar to those of the product of Example 1.

Example 3: Prepare a solution from 23.2 parts of anhydrous sodium tetrasulfid, 18 parts of sulfur and 60 parts of alcohol, and introduce 12 parts of the indophenol obtainable from dimethyl-para-phenylene-diamin and ortho-mono-chlor-phenol, and possessing a constitution corresponding to the formula

and boil the whole vigorously in a reflux apparatus for about 40 hours, while well stirring. Work up the product as described in the foregoing examples, whereupon a coloring matter is obtained which from the hydrosulfite vat dyes cotton beautiful blue shades of excellent fastness. If, in this example, instead of the above mentioned indophenol, that obtainable from dimethyl-para-phenylene-diamin and ortho-ortho-dichlor-phenol or the corresponding para-dimethyl-amino-pará-hydroxy-metá-metá-dichlor-diphenylamin be employed, a coloring matter is obtained which can also be used for dyeing from an alkaline hydrosulfite vat yielding beautiful blue shades of excellent fastness.

Example 4: Heat together, in a reflux apparatus, 23.2 parts of anhydrous sodium tetrasulfid, 60 parts of alcohol and 18 parts of sulfur, and, when solution has taken place, add 12 parts of dimethyl-thionolin possessing a constitution corresponding to the formula

and boil the whole for about 40 hours. Then filter off the product and extract it with hot 10% sodium sulfid solution. The coloring matter thus obtained yields a light yellow vat with alkaline hydrosulfite and dyes cotton beautiful blue shades which are characterized by being much faster, in particular against washing, topping and potting, than the coloring matters obtainable from methylene violet according to the process of the said Letters Patent No. 679,199.

Example 5: Prepare a solution from 23.2 parts of anhydrous sodium tetrasulfid, 18 parts of sulfur and 60 parts of alcohol, and then add, gradually, 12 parts of para-dimethyl-amino-pará-hydroxy-metá-metá-dichlor-diphenylamin-mercaptan possessing a constitution corresponding to the formula

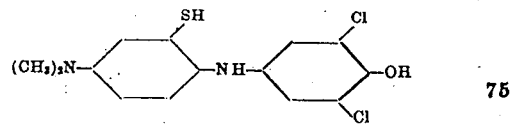

(obtainable by oxidizing together dimethyl-para-phenylene-diamin-thiosulfonic acid and ortho-ortho-dichlor-phenol and reducing the product with sodium sulfid). Boil the whole for from 20 to 30 hours, in a reflux apparatus, and work up the product as described in the foregoing Example 4. The coloring matter yields a light yellow vat with alkaline hydrosulfite and dyes cotton greenish blue shades of excellent fastness.

Example 6: Dissolve 12 parts of para-dimethyl-amino-pará-hydroxy-metá-metá-dichlor-diphenylamin-mercaptan in a hot solution of 48 parts of crystallized sodium sulfid in 24 parts of water. Then add 29 parts of sulfur and boil the whole, in a reflux apparatus, for about 30 hours. When the mixture is cold, separate the reaction product from the supernatant liquid, grind it well, extract it with boiling 10% sodium sulfid solution, and wash it with water. The coloring matter then has properties similar to those of the coloring matter obtained according to the foregoing Example 5.

Example 7: Introduce 12 parts of the coloring matter obtainable from dimethyl-thionolin according to the specification of Patent No. 679,199 into a solution of 48 parts of crystallized sodium sulfid in 24 parts of water, and then add 29.1 parts of sulfur. Boil the whole, in a reflux apparatus, for from 70 to 80 hours, while stirring, then add 30 parts of 10% sodium sulfid solution, grind the whole, boil up and filter, extract the residue repeatedly with hot 10% sodium sulfid solution and wash it with hot water. The coloring matter thus obtained is practically insoluble in sodium sulfid solution, but yields a yellow solution in sodium hydrosulfite and alkali, and dyes cotton greenish blue shades of excellent fastness against the action of washing, topping, potting, chlorin and light.

Example 8: Mix together 18 parts of sulfur and 60 parts of alcohol and then, while stirring well, add 23.2 parts of anhydrous sodium tetrasulfid. To this solution add 12 parts of the coloring matter obtainable from dimethyl-thionolin as described in the specification of Patent No. 679,199 and boil the mixture (while stirring well) for from 80 to 85 hours. Then filter off the coloring matter, extract it repeatedly with hot 10% sodium sulfid solution, and wash it. It has properties similar to those of the coloring matter obtained according to Example 7 above.

On heating the coloring matter obtainable from para-dimethyl-amino-para-hydroxy-diphenylamin according to the specification of Patent No. 693,632 in a manner analogous to that described in the foregoing Example 8, a coloring matter of similar shade and excellent fastness can be obtained.

Example 9: Heat together, in a reflux apparatus, 23.2 parts of anhydrous sodium tetrasulfid, 60 parts of alcohol and 18 parts of sulfur, and, after solution has been obtained, add 12 parts of the leuco indophenol obtainable by oxidizing together ortho-chlorphenol and para-phenylene-diamin and reducing the product with sodium sulfid and possessing a constitution corresponding to the formula

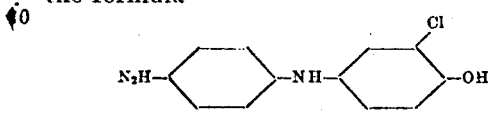

Then boil the whole, in a reflux apparatus, for from 80 to 100 hours. Filter off the coloring matter, extract it with hot 10% sodium sulfid solution and wash it with water. It dyes cotton from a hydrosulfite vat blue shades of excellent fastness against the action of washing and light.

Example 10: Prepare a solution from 23.2 parts of anhydrous sodium tetrasulfid, 18 parts of sulfur and 60 parts of alcohol, and add, gradually, 12 parts of the leuco indophenol obtainable from ortho-ortho-dichlorpara-aminophenol and para-xylidene and possessing a constitution corresponding to the formula

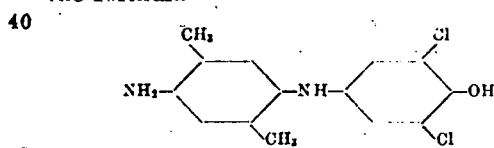

Boil the whole, in a reflux apparatus, for from 70 to 80 hours and work up the product as described in the foregoing Example 9. The coloring matter yields a light yellow solution in alkaline hydrosulfite and dyes cotton deep violet-blue shades. It has great covering power and is fast against the action of washing, and light.

Example 11: Treat the leuco indophenol obtained from para-aminophenol and monoethyl-anilin and possessing a constitution corresponding to the formula

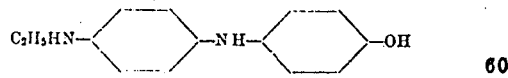

in the manner described in the foregoing Example 9. The coloring matter thus obtained dyes cotton clear reddish blue shades.

Now what we claim is:—

1. The new coloring matters containing sulfur which consist, when dry, of dark powders which are soluble in concentrated sulfuric acid giving blue to violet solutions, which coloring matters are practically insoluble in caustic alkali solution and in sodium sulfid solution, but yield solutions with a solution of ammonium sulfid containing caustic soda, which solutions, when poured on filter paper, rapidly oxidize, giving blue to violet stains, which coloring matters also are soluble in alkaline hydrosulfite solution yielding yellowish vats which dye cotton from green-blue to violet-blue shades of excellent fastness.

2. The coloring matter containing sulfur which is obtainable from dimethyl-thionolin of the formula

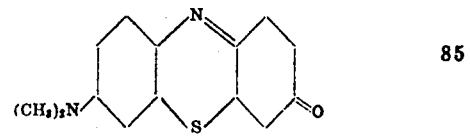

which coloring matter consists, when dry, of a dark powder which yields a blue solution in concentrated sulfuric acid, which coloring matter is practically insoluble in caustic alkali solution and in sodium sulfid solution, but yields a solution with aqueous ammonium sulfid containing caustic soda, which solution, when poured on filter paper, rapidly oxidizes, giving rise to a bluish-violet stain, which coloring matter yields a light yellow vat with alkaline hydrosulfite and dyes cotton beautiful blue shades of excellent fastness.

In testimony whereof we have hereunto set our hands in the presence of two subscribing witnesses.

ARTHUR LÜTTRINGHAUS.
HEINRICH von DIESBACH.
ERNST SCHWARZ.

Witnesses:
J. ALEC. LLOYD,
JOSEPH PFEIFFER.